(No Model.) 4 Sheets—Sheet 1.

J. SIMON.
SEED PLANTER.

No. 370,564. Patented Sept. 27, 1887.

ATTEST.
J. Henry Kaiser
Victor J. Evans

INVENTOR
Joseph Simon
By L. Deere
his Atty.

(No Model.) 4 Sheets—Sheet 2.

J. SIMON.
SEED PLANTER.

No. 370,564. Patented Sept. 27, 1887.

ATTEST.
J. Henry Kaiser.
Victor J. Evans.

INVENTOR.
Joseph Simon
By L. Deane
his Atty.

(No Model.) 4 Sheets—Sheet 3.
J. SIMON.
SEED PLANTER.
No. 370,564. Patented Sept. 27, 1887.
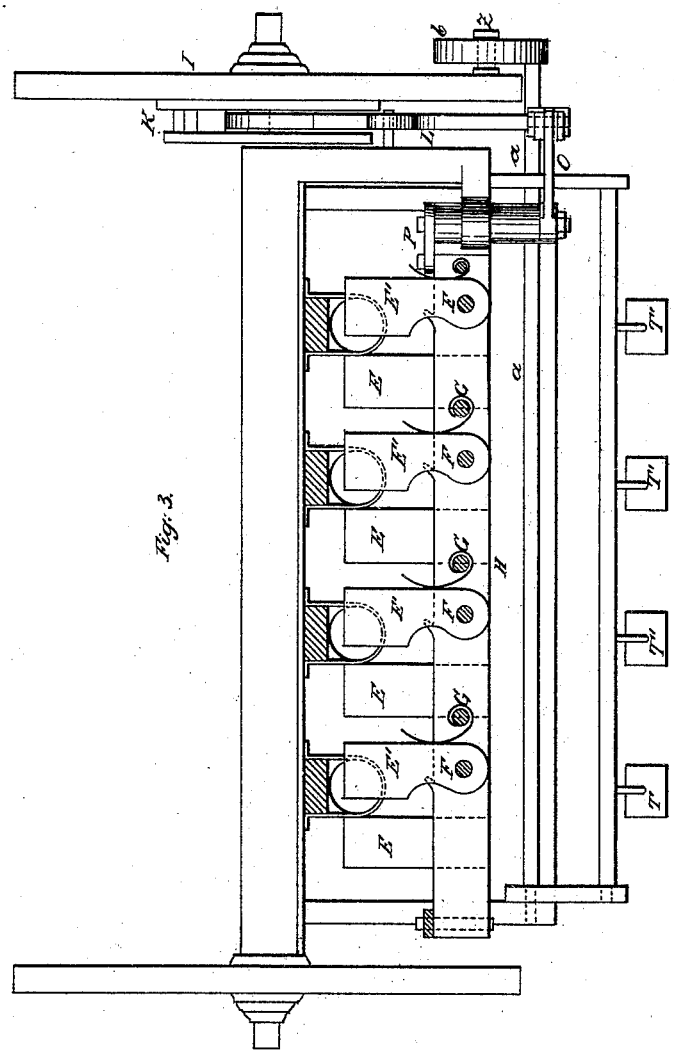
ATTEST.
J. Henry Kaiser.
Victor J. Evans.
INVENTOR.
Joseph Simon
By L. Deane
his Atty.

(No Model.) 4 Sheets—Sheet 4.
J. SIMON.
SEED PLANTER.
No. 370,564. Patented Sept. 27, 1887.
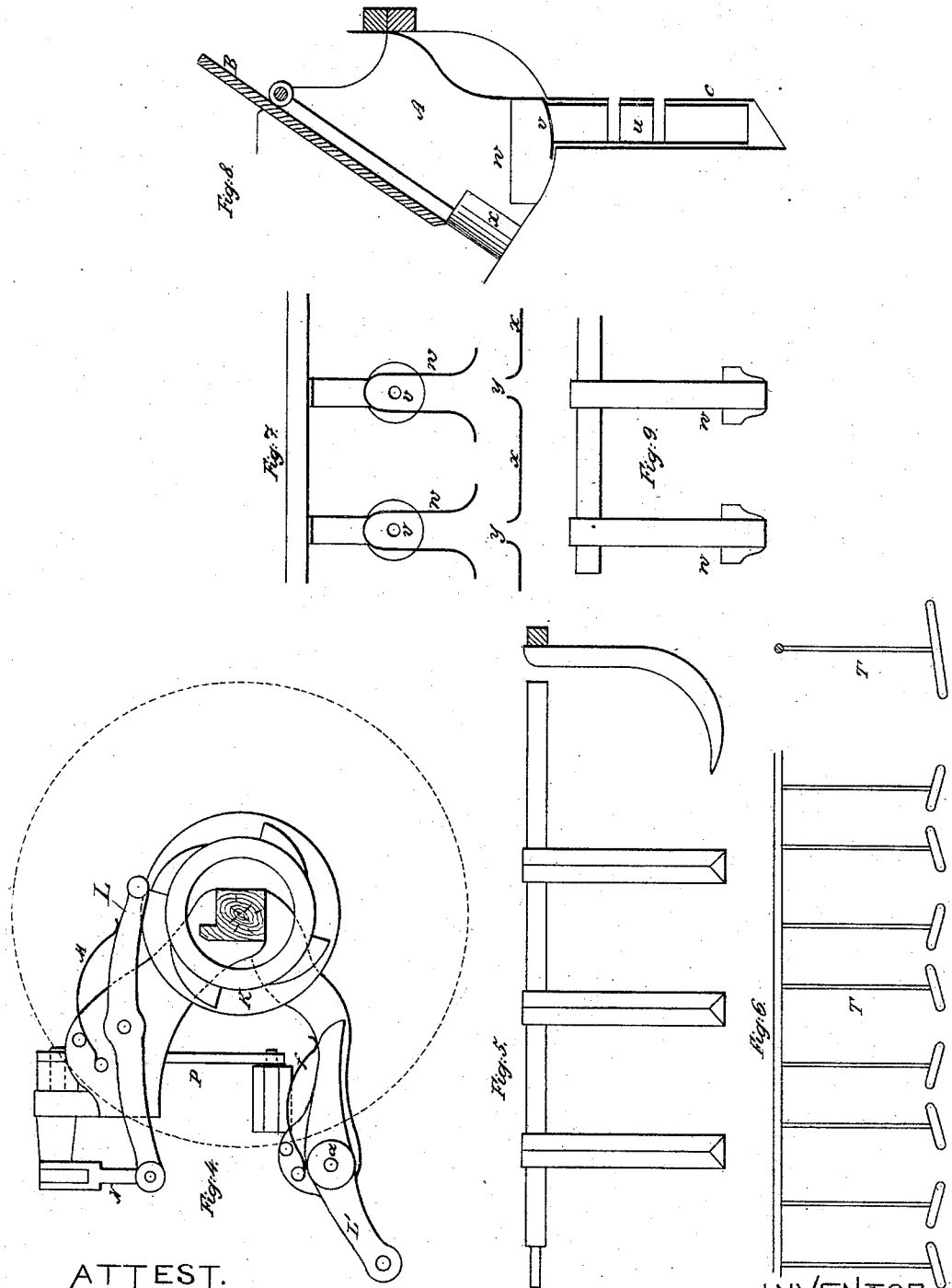
ATTEST.
J. Henry Kaiser.
Victor J. Evans.
INVENTOR.
Joseph Simon
By L. Deane,
His Atty.

UNITED STATES PATENT OFFICE.

JOSEPH SIMON, OF STÜRZELBRONN, NEAR BITSCH, PRUSSIA, GERMANY.

SEED-PLANTER.

SPECIFICATION forming part of Letters Patent No. 370,564, dated September 27, 1887.

Application filed June 16, 1887. Serial No. 241,572. (No model.)

*To all whom it may concern:*

Be it known that I, JOSEPH SIMON, residing at Stürzelbronn, near Bitsch, in the Kingdom of Prussia, German Empire, have invented certain new and useful Improvements in Machines for Planting Potatoes, Beans, Indian Corn, &c.; and I do hereby declare the following to be a full, clear, and exact description of the invention, such as will enable others skilled in the art to which it appertains to make and use the same.

Figure 1:
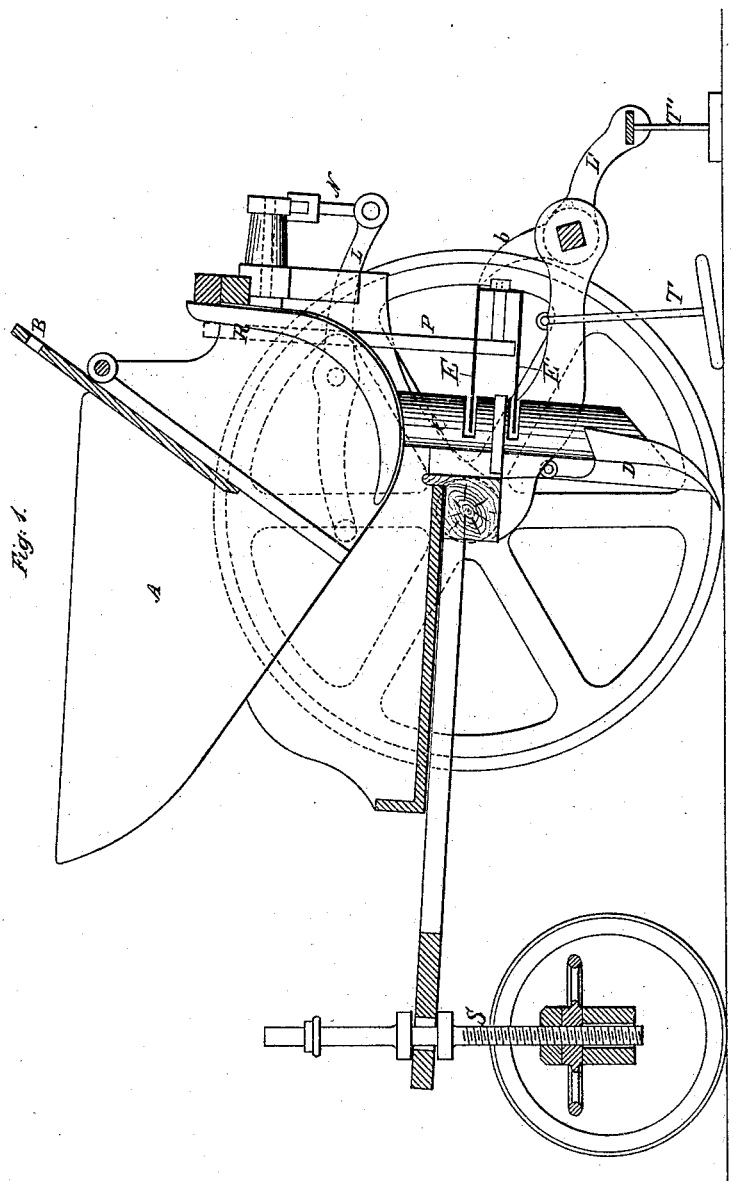
Figure 2:
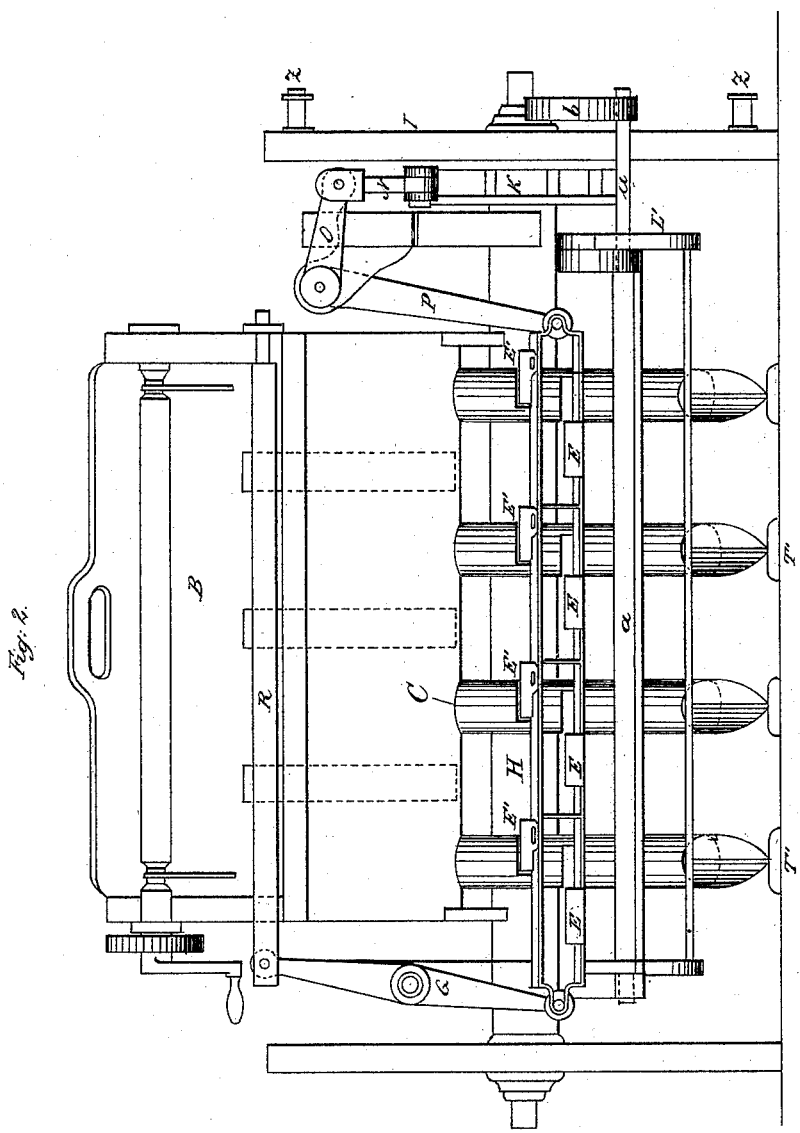

In the accompanying drawings, Figure 1 shows the machine in side elevation and partially in section. Fig. 2 is a rear elevation. Fig. 3 is a plan showing the mechanism for moving the drawers. Figs. 4 to 9 are details.

The machine, constructed in the usual manner for drilling or sowing, is mounted upon a frame reposing on four wheels. The fore part can be adjusted by means of a screw, S, Fig. 1. The rear part, reposing on the principal axle, consists of the box A, which can be divided by the adjustable partition B into two compartments. This box contains the potatoes or other seed to be planted.

On the lowest point of the box a row of tubes, C, is attached, through which the potatoes are conducted, one by one, into the furrow made by the share D. This procedure is regulated by two cut-offs or slides, E and E', working on the middle of the tubes. These cut-offs or slides, working in slits, are arranged one below the other in a manner that they obstruct alternatively the tube, so that but one seed at a time may pass. At the moment when the under cut-off or slide opens the tube and drops the potato lying upon it the upper cut-off or slide, E', enters in the slit and prevents the upper potatoes from following. To prevent the potatoes being cut in pieces, the upper cut-off, E', is pivoted, and turns on its journal around the point F if it strikes against a seed and clinches it by the spring G. The seesaw motion of the slides fixed on a common rod, H, is effected from the wheel I. A cog-wheel, K, fixed on the axle of wheel I, works upon a lever, L, which is pressed by the spring M into the cogs or teeth of each. If the wheel revolves, the lever L swings round its pivot and effects, by means of the connecting-rod N and the levers O and P, the seesaw motion of the rod H. The lever Q, on the other side of rod H, is attached to and acts upon an agitating apparatus shown by Fig. 5. By this apparatus, which makes also a seesaw motion, the potatoes in the under part of box A are continually agitated to prevent an obstruction of the tubes C. The potato laid into the furrow is buried by the share T, Figs. 1 and 6, which is attached in rear of the tube C.

The cog-wheel K may be changed and replaced by another one having more or less teeth. This depends upon the distance apart the seed is to be planted.

For planting peas, beans, &c., another arrangement must be made. Into the tubes C other tubes, U, of a smaller diameter, are placed, Figs. 7 and 8, the upper opening of which, $v$, let pass but one kernel of beans, peas, corn, &c., at a time. Instead of the agitating apparatus shown at Fig. 5, another one, Figs. 7 and 9, is substituted. Curved plates W, agitated lightly by the apparatus, surround, like walls, the openings $v$. The slide B descends deeply and is closed below by a tin plate, X, with openings $y$ corresponding with the openings of the tubes $v$.

If less rows are to be planted, as the machine has tubes, a part of them can be excluded by closing the openings $y$ corresponding with them by cut-offs or plates.

To cover the Indian corn there is made a special arrangement. Instead of the share T, a die, T', is working here which is operated by the lever L'. On the ring of the wheel I are adapted pivots Z, the number of which corresponds with the number of teeth of the cog-wheel K. On the prolongation of the axle $a$ of lever L' a second lever, C, is fixed, which is lifted by the pivots Z as soon as the wheel I turns. By this manipulation the lever L' and the die T' receive a downward-directed movement and the corn is pressed into the ground. A spring, $f$, pressing on the prolongation of lever L', removes the latter as soon as the pressure of the pivot ceases.

I claim—

1. In a potato-planter, the seed-box A, partition B, tubes C, cut-offs or slides E E', attached to rods H H, lever L, connecting-rod N, levers O P, share or furrow-openers D, and coverers H, all substantially as set forth.

2. In a potato-planter, the seed-box A, tubes C, cut-offs or slides E E', attached to rods actuated as described, springs G, levers L, connecting-rod N, levers O P, in combination with the agitator R and lever Q, all substantially as specified.

In testimony whereof I affix my signature in presence of two witnesses.

JOSEPH SIMON.

Witnesses:
PAUL SELDEN,
E. JOHNSON.